Dec. 10, 1946.  H. V. PEDERSEN  2,412,286
STATIONARY FLASH CALCINING FURNACE
Filed Jan. 20, 1944  2 Sheets-Sheet 1
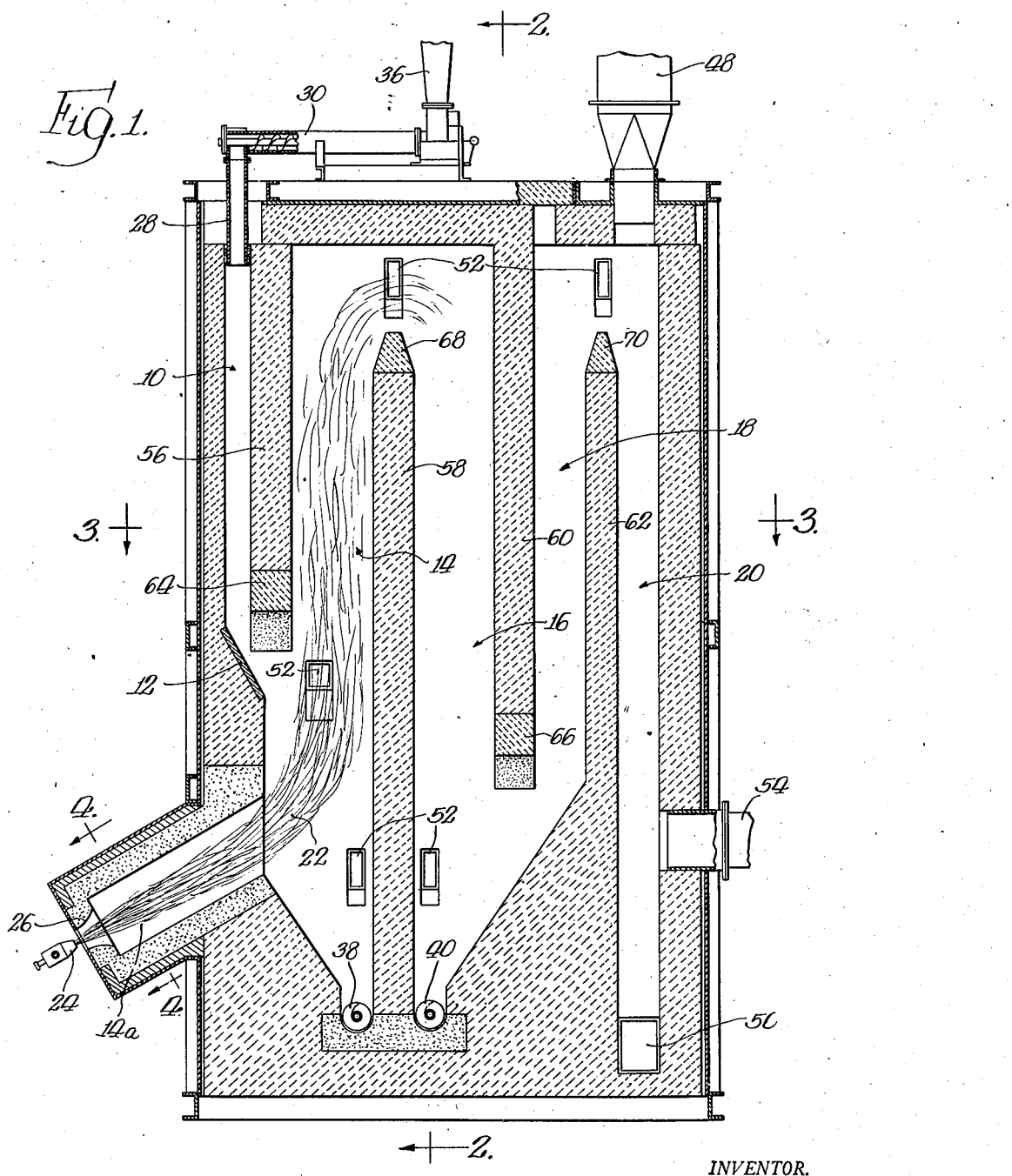
INVENTOR.
Hans U. Pedersen,
BY Bair & Freeman
Attys

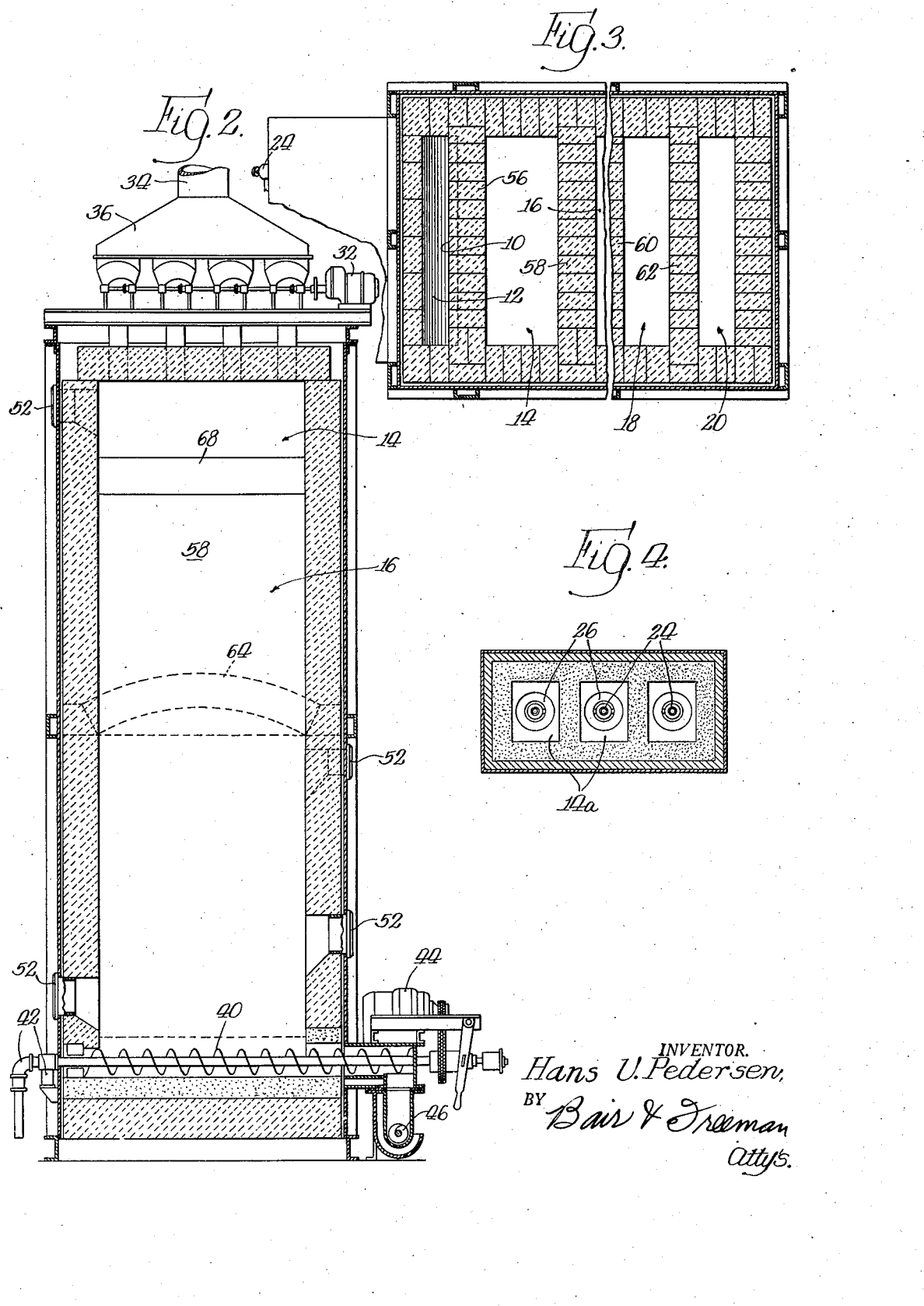

Patented Dec. 10, 1946

2,412,286

UNITED STATES PATENT OFFICE 2,412,286

STATIONARY FLASH CALCINING FURNACE

Hans V. Pedersen, Marshalltown, Iowa

Application January 20, 1944, Serial No. 519,009

7 Claims. (Cl. 263—29)

My invention relates to a furnace for calcining material and particularly dried waste sludge from a water softening plant whereby such sludge is reconverted into a product containing all the properties of quick lime so that it can be used over again in the water softening process.

One object of the invention is to provide a relatively simple and inexpensive furnace of this general character which is economical to operate.

Another object is to provide a calcining furnace in which the dried sludge, which is predominately calcium carbonate, may be continuously fed to the furnace and so distributed with respect to the flame in the furnace as to secure a maximum of efficiency in the calcining process.

More particularly, it is my object to feed the calcium carbonate through a vertical chamber or passageway wherein gravity and velocity cause the materials to impinge a splash-spreader plate with sufficient force to reduce it to fine particles which are spread fan shaped across the flame issuing from the burner into a combustion chamber of the furnace.

Another object is to provide means for removing quick lime from the bottom of the calcining furnace and means for disposing of the carbon dioxide resulting from the flame projected into the combustion chamber and the volatile substances removed thereby from the calcium carbonate.

With these and other objects in view, my invention consists in the construction, arrangement and combination of the various parts of my calcining furnace whereby the objects contemplated are attained, as hereinafter more fully set forth, pointed out in my claims and illustrated in the accompanying drawings, wherein:

Figure 1 is a vertical sectional view through a calcining furnace embodying my invention.

Figure 2 is another vertical sectional view taken at right angles to Figure 1 and on the line 2—2 thereof.

Figure 3 is a horizontal sectional view on the line 3—3 of Figure 1 with parts broken away to conserve space on the drawings.

Figure 4 is a sectional view on the line 4—4 of Figure 1 to show the portion of the combustion chamber of the furnace into which the flames are projected from fuel nozzles or the like.

On the accompanying drawings I have used the reference numeral 10 to indicate the gravity chamber of my calcining furnace, 12 the splash-spreader plate thereof and 14 the combustion chamber. In addition to the chambers 10 and 14 there is a separation chamber 16, a stack chamber 18 and a settling chamber 20. All of these chambers are formed by building a substantially rectangular structure from fire brick or the like as illustrated in Figure 3, although the walls are not shown as to the brick detail in Figures 1 and 2.

The various chambers 10, 14, 16, 18 and 20 are vertically arranged and communicating with the combustion chamber 14 is a portion 14a of that chamber designed for receiving the flames 22 from a plurality of fuel nozzles 24 to which fuel such as oil is supplied under pressure. The necessary air for supporting combustion enters through Venturi openings 26 or may be supplied under pressure if desired.

The combustion chamber portion 14a is adjacent the bottom of the combustion chamber 14 and at one side thereof. The flames 22 pass through the combustion chamber portion 14a at an upwardly sloping angle and then travel vertically through the combustion chamber 14. The flames may reach as far into the furnace as the top of the chamber 14.

At the top of the furnace a plurality of feed tubes 28 enter the gravity chamber 10 and each depends from one end of a horizontal screw conveyor 30. These conveyors may be driven in any suitable manner such as by an electric motor 32 (see Figure 2). The conveyors 30 are fed with calcium carbonate flowing downwardly by gravity from a supply pipe 34 and through a manifold 36 connected with the conveyors. The horizontal portions of the conveyors become filled with the calcium carbonate so as to effect a seal as well as a feeding means for the upper end of the gravity chamber.

The splash-spreader plate 12 it will be noted, is mounted so as to form an inclined bottom for the gravity chamber 10 sloping downwardly and inwardly toward the combustion chamber 14. The plate 12, is made preferably of a heat and wear resisting material, polished smooth on its upper surface. Its purpose as will hereinafter appear, is to spread the calcium carbonate fan-wise across the flame 22 upon the calcium carbonate impinging the plate 12 due to gravity and velocity acting thereon.

In the bottom of the combustion chamber 14 and likewise in the bottom of the separation chamber 16 are spiral conveyors 38 and 40 respectively for sealing the bottoms of these chambers and removing quick lime from the furnace. The conveyors 38 and 40 are preferably water-cooled by passing water through tubular shafts of the conveyors, the piping therefor being shown at 42 in Figure 2. The conveyors 38 and 40 may be suitably driven as by an electric motor 44. They discharge their contents into a cross conveyor 46 which may extend to a storage bin or the like.

The stack chamber 18 communicates at its top with a stack or chimney 48, through which carbon dioxide is discharged to atmosphere. The stack 48 is offset with respect to the stack chamber 18 so as to more effectively permit settling of any residual quick lime in the settling chamber 20. A clean-out 50 is provided for the settling chamber 20, and other clean-outs are provided as indicated at 52 at other points in the furnace. A conduit 54 may be connected with the settling chamber 20 for taking off hot air for utilizing some of the heat of the furnace (which would otherwise be wasted) for various purposes, such as drying the waste sludge from a water softening plant to thereby condition it for feeding to my calcining furnace.

The various chambers in my calcining furnace are defined by partition walls 56, 58, 60 and 62. The walls 56 and 60 depend from the top of the furnace and are supported by arches 64 and 66. The walls 58 and 62 extend upwardly from the bottom and are capped by fire brick elements 68 and 70 to define the path of the calcium carbonate, quick lime and carbon dioxide through the furnace.

Practical operation

The waste sludge from a water softening plant results from softening hard water by thoroughly mixing quick lime with it for a period of approximately 30 minutes and then permitting the lime to settle out in a settling tank. During this process, the quick lime undergoes a chemical change and the precipitated solids no longer have the properties of quick lime but become inert substances, the greater part of which is calcium carbonate or limestone. This residue or sludge is usually wasted by discharging it upon low land and may be used after drying as a soil conditioner. In many localities there is no economical use for it however and if it can be recovered and reused in the water softening process, such procedure is desirable if it can be done at small expense.

By calcining the sludge after it has been dried it may be converted back into a product containing all the properties of quick lime so that it can be used over again in the water softening process. The furnace I have disclosed calcines the sludge without prohibitive cost of operation. The term "calcining" denotes the process of subjecting calcium carbonate in dried form to high temperatures so as to expel volatile material and drive off the carbon dioxide. When this is successfully done, the calcined calcium carbonate is converted back into a substance which is substantially quick lime.

Calcium carbonate is a very fine grained powder. Approximately 50% of it will pass through a 2,000 mesh sieve. Calcining dried waste sludge can be performed in stationary lime kilns or rotary kilns, but since the sludge from a water softening plant is so fine in texture, it is difficult to calcine and to handle. Using stationary and rotary kilns for this purpose cannot be done economically.

With my furnace I have found that economical calcining is entirely possible when the furnace is constructed substantially in accordance with the present disclosure.

In operation, hot freshly dried calcium carbonate is slowly fed by the conveyors 30 into the tubes 28 and the material drops by gravity through the tubes and through the gravity chamber 10. Velocity is attained by the particles of material so that when they impinge the splash-spreader plate 12 the attained force is such as to spread the material out fan shaped, breaking it up so that it enters the combustion chamber 14 as a cloud of smoke rather than lumps. The particles of calcium carbonate are deflected by the plate 12 so as to be thrown directly across the path of the flame 22 and when they come in contact with the flame, carbon dioxide is quickly liberated from the calcium carbonate due to the intense heat of approximately 2,000° F. Accordingly, by the time the particles reach the top of the combustion chamber 14 they are calcined. Most of the particles are carried upwardly by the draft created by the stack 14 and the heat of the flame 22, whereas some of them become calcined within the combustion chamber 14 and fall to the bottom thereof and enter the conveyor 38. It will be remembered that the calcined particles are quick lime so that the material removed by the conveyor 38 is directly usable as a water softening agent.

The calcined particles that pass into the separation chamber 16 drop into the conveyor 40 because during the process of carbon dioxide liberation the fine particles of material fuse together and thereby increase in weight and settle to the conveyor 40. Since carbon dioxide is a gas, it is drawn out of the separation chamber 16 by the draft through the stack chamber 18 and into the stack 48. A small percentage of quick lime may still be suspended in the products of combustion passing upwardly through the stack chamber 18 and some of this quick lime can still settle back into the settling chamber 20 to be cleaned out at the clean-out 50.

I have found by experiments that the success of calcination depends entirely upon the manner in which the material is fed into the flame. Carbon dioxide will not be liberated from calcium carbonate as long as it remains stationary no matter how much heat is applied. By feeding the very fine calcium carbonate into the flame as thinly as possible, calcination may be practiced with a maximum of salvage and a minimum of fuel for the flame. The combination of the gravity chamber 10 and the splash-spreader plate 12 I have found to be the answer to this problem.

By constructing a calcining furnace in accordance with my disclosure, it is possible to secure a very efficient calcination of dried waste sludge and secure a resultant product that is entirely satisfactory for reuse as a water softening agent.

Some changes may be made in the construction and arrangement of the parts of my furnaces without departing from the real spirit and purpose of my invention, and it is my intention to cover by my claims any modified forms of structure or use of mechanical equivalents which may be reasonably included within their scope without sacrificing any of the advantages thereof.

I claim as my invention:

1. In a calcining furnace, a vertical combustion chamber, means for projecting a flame angularly upward therethrough from the side and adjacent the bottom thereof, a splash-spreader plate at one side of said combustion chamber, a gravity chamber above said splash-spreader plate comprising a vertical passageway, a partition between said combustion chamber and said gravity chamber terminating at its lower end in spaced relation with said splash-spreader plate, means at the top of said gravity chamber to seal the same and feed calcium carbonate downwardly to said gravity chamber, said splash-spreader plate, due to the velocity imparted to said calcium carbonate by gravity, causing it to spread in a fan shape across the flame in said combustion chamber, means at the bottom of said combustion chamber for sealing said bottom and for removing quick lime which results from the combustion of said calcium carbonate from said furnace, and means for disposing of carbon dioxide resulting from combustion of said calcium carbonate from the top of said combustion chamber.

2. In a calcining furnace, a vertical combustion chamber, means for projecting a flame through said combustion chamber, a splash-spreader plate at one side of said combustion chamber, a gravity chamber above said plate, means at the top of the gravity chamber to seal the same and feed material to be calcined to said gravity chamber, a partition between said combustion chamber and said gravity chamber and terminating at its lower end spaced from said plate, said plate forming a bottom for said gravity chamber sloping from the horizontal toward said combustion chamber, whereby the material dropping on and impinging against the plate is spread in a fan shape across the flame in said combustion chamber, means at the bottom of the combustion chamber for sealing said bottom and removing quick lime resulting from the combustion of said calcium carbonate from said furnace, and means for disposing of the carbon dioxide resulting from the combustion of the said calcium carbonate issuing from the top of said combustion chamber.

3. In a calcining furnace, a vertical combustion chamber, means for projecting a flame upwardly into said combustion chamber from the side and adjacent the bottom thereof, a splash-spreader plate at one side of said combustion chamber, a gravity chamber above said splash-spreader plate and comprising a vertical passageway having means at the top thereof to feed calcium carbonate to said gravity chamber, a partition separating said combustion and gravity chambers from each other, said plate sloping downwardly toward said combustion chamber, whereby the calcium carbonate impinging against said plate is spread in a fan shape across the flame in said combustion chamber, said partition having an opening through which the calcium carbonate is spread, means for removing quick lime resulting from the combustion of said calcium carbonate from said combustion chamber, and a stack for disposing of the carbon dioxide resulting from the combustion of said calcium carbonate issuing from the top of said combustion chamber.

4. In a calcining furnace, a vertical combustion chamber, means for projecting a flame upwardly through said combustion chamber, a splash-spreader plate at one side of said combustion chamber, a gravity chamber above said plate, a partition between said combustion chamber and said gravity chamber in such position relative to said chambers that said gravity chamber is considerably narrower than said combustion chamber, means at the top of the gravity chamber to feed calcium thereto, said plate forming a bottom for said gravity chamber and sloping downwardly toward said combustion chamber, whereby the calcium carbonate dropping thereon is, due to the velocity imparted thereto by gravity, spread in a fan shape across the flame in said combustion chamber, and separate means for removing quick lime and carbon dioxide resulting from the combustion of said calcium carbonate from said combustion chamber.

5. A calcining furnace of the character disclosed, comprising a vertical combustion chamber, means for projecting a flame upwardly into said combustion chamber, a splash-spreader plate at one side of said combustion chamber, a vertical passageway, means at the top of said vertical passageway to seal the same and feed calcium carbonate thereto, said plate forming a bottom for said vertical passageway sloping downwardly toward said combustion chamber, whereby the calcium carbonate drops through said passageway and impinges on said plate and, due to the velocity imparted thereto resulting from gravity, spreads in a fan shape across the flame in said combustion chamber, a partition between said combustion chamber and said gravity chamber to separate the two into a relatively narrow gravity chamber and a relatively wide combustion chamber, means for removing quick lime resulting from the combustion of said calcium carbonate from said furnace, and means for disposing of the carbon dioxide resulting from the combustion of said calcium carbonate issuing from said combustion chamber.

6. A calcining furnace comprising a vertical combustion chamber, means for projecting a flame upwardly therethrough, a splash-spreader plate at one side of said combustion chamber, a gravity chamber above said plate comprising a vertical passageway having means at the top thereof to seal the vertical passageway and feed calcium carbonate thereto, said plate sloping downwardly toward said combustion chamber, whereby the calcium carbonate dropping thereon impinges against the plate and is spread in a fan shape across the flame in said combustion chamber, a partition between said combustion chamber and said gravity chamber, said partition terminating adjacent said plate, means at the bottom of said combustion chamber for removing quick lime resulting from the combustion of calcium carbonate from said furnace, a separation chamber communicating with the top of said combustion chamber and conducting quick lime and carbon dioxide resulting from the combustion of said calcium carbonate downwardly, a second quick lime removing means at the bottom of said separation chamber, and means for disposing of carbon dioxide issuing from the bottom of said separation chamber.

7. In a calcining furnace, a relatively wide elongated vertical combustion chamber, means for projecting a flame longitudinally therethrough, a splash-spreader plate, a relatively narrow chamber adjacent said plate, means for forcibly feeding calcium carbonate to said narrow chamber and dropping it against said plate, whereby the calcium carbonate impinges on the plate and is spread in a fan shape across the flame in said combustion chamber, a partition separating said chambers from each other, said partition having an opening therethrough adjacent said plate, and means for removing quick lime resulting from the combustion of said calcium carbonate from said combustion chamber.

HANS V. PEDERSEN.